(12) United States Patent
Seo et al.

(10) Patent No.: US 8,968,862 B2
(45) Date of Patent: Mar. 3, 2015

(54) POLARIZER HAVING PROTECTION FILMS IN TWO SIDES AND OPTICAL DEVICE COMPRISING THE SAME

(71) Applicant: LG Chem, Ltd., Seoul (KR)

(72) Inventors: Eun-Mi Seo, Daejeon-si (KR);
Hwa-Sub Shim, Daejeon-si (KR);
Jee-Hyon Min, Gyeonggi-do (KR);
Nam-Jeong Lee, Daejeon-si (KR);
Kyun-Il Rah, Daejeon-si (KR);
Jun-Wuk Park, Daejeon-si (KR);
Eun-Soo Huh, Daejeon-si (KR);
Yi-Rang Lim, Daejeon-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/823,449

(22) PCT Filed: Oct. 12, 2012

(86) PCT No.: PCT/KR2012/008329
§ 371 (c)(1),
(2) Date: Mar. 14, 2013

(87) PCT Pub. No.: WO2013/055154
PCT Pub. Date: Apr. 18, 2013

(65) Prior Publication Data
US 2014/0106149 A1    Apr. 17, 2014

(30) Foreign Application Priority Data

Oct. 14, 2011 (KR) .......... 10-2011-0105505
Dec. 28, 2011 (KR) .......... 10-2011-0145111
Oct. 12, 2012 (KR) .......... 10-2012-0113304

(51) Int. Cl.

| B32B 7/02 | (2006.01) |
|---|---|
| B32B 7/12 | (2006.01) |
| C07D 303/40 | (2006.01) |
| C08G 65/18 | (2006.01) |
| B41J 2/16 | (2006.01) |
| C08G 59/68 | (2006.01) |
| G03F 7/029 | (2006.01) |
| G02B 5/30 | (2006.01) |
| C09J 4/06 | (2006.01) |
| C09J 5/00 | (2006.01) |
| C09J 163/00 | (2006.01) |

(52) U.S. Cl.
CPC . *G02B 5/305* (2013.01); *C09J 4/06* (2013.01); *C09J 2463/00* (2013.01); *C09J 5/00* (2013.01); *C09J 163/00* (2013.01)
USPC .......... 428/216; 428/345; 522/170; 522/168; 522/181; 522/31; 522/66

(58) Field of Classification Search
CPC ........ C09J 163/00; C09J 4/06; C09J 2463/00; C09J 5/00

USPC .......... 428/216, 345, 412–415, 417–420, 428/355 R–355 N, 355 EP; 156/329; 528/44; 349/96; 522/170

See application file for complete search history.

(56) References Cited

U.S. PATENT DOCUMENTS

| 8,044,163 B2 * | 10/2011 | Uchida et al. ............... 528/44 |
|---|---|---|
| 8,344,083 B2 | 1/2013 | Um et al. |
| 2002/0074086 A1 * | 6/2002 | Nakamura et al. ........... 156/329 |
| 2003/0004278 A1 | 1/2003 | Asano et al. |
| 2007/0087123 A1 * | 4/2007 | Weber et al. ................ 427/355 |
| 2008/0108721 A1 | 5/2008 | Ha et al. |
| 2009/0097129 A1 | 4/2009 | Naito et al. |
| 2009/0115945 A1 * | 5/2009 | Inokuchi et al. ............. 349/96 |
| 2009/0312515 A1 | 12/2009 | Uchida et al. |
| 2011/0157525 A1 | 6/2011 | Yamasaki et al. |
| 2011/0195249 A1 * | 8/2011 | Song et al. .................. 428/345 |
| 2013/0044286 A1 | 2/2013 | Yoon et al. |
| 2013/0052434 A1 | 2/2013 | Asahi et al. |

FOREIGN PATENT DOCUMENTS

| CN | 101824296 A | 9/2010 |
|---|---|---|
| CN | 101845286 A | 9/2010 |
| CN | 101910890 A | 12/2010 |
| CN | 102112899 A | 6/2011 |
| CN | 102197101 A | 9/2011 |
| JP | 2001151814 A | 6/2001 |
| JP | 2002120326 A | 4/2002 |
| JP | 2000230016 A | 8/2002 |

(Continued)

OTHER PUBLICATIONS

Gelest, Inc. "Silane Coupling Agents: Connecting Across Boundaries", Jul. 10, 2012 (or earlier), p. 5.*
Gelest Inc.: "Silane Coupling Agents: Connecting Across Boundaries", pp. 5, 2006.

*Primary Examiner* — Prashant J Khatri
*Assistant Examiner* — Travis Figg
(74) *Attorney, Agent, or Firm* — McKenna Long & Aldridge, LLP

(57) ABSTRACT

A double-sided polarizer includes a polarizing film, a first adhesive layer formed on one surface of the polarizing film, a second adhesive layer formed on the other surface of the polarizing film, a first transparent film formed on the first adhesive layer, and a second transparent film formed on the second adhesive layer, wherein the first adhesive layer and the second adhesive layer are formed of an active energy line-curable adhesive and the first adhesive layer is 0.1 μm to 3 μm thick, and there is also provided an optical device including the double-sided polarizer.

10 Claims, No Drawings

(56) References Cited

FOREIGN PATENT DOCUMENTS

| | | |
|---|---|---|
| JP | 2008-134385 A | 6/2008 |
| JP | 2008-257199 A | 10/2008 |
| JP | 2010-55062 A | 3/2010 |
| JP | 2010-102214 | 5/2010 |
| JP | 2010-209126 A | 9/2010 |
| JP | 2011-39362 A | 2/2011 |
| JP | 2011-219548 A | 11/2011 |
| JP | 2012-140610 A | 7/2012 |
| KR | 20020030852 A | 4/2002 |
| KR | 100773634 B | 11/2007 |
| KR | 10-2009-0038373 | 4/2009 |
| KR | 10-2009-0043441 A | 5/2009 |
| KR | 20090115040 A | 11/2009 |
| KR | 10-2010-0030586 | 3/2010 |
| KR | 10-2010-0068178 | 6/2010 |
| KR | 10-2010-0100602 | 9/2010 |
| KR | 10-2010-0100695 A | 9/2010 |
| KR | 10-2010-0117591 | 11/2010 |
| KR | 101010574 B | 1/2011 |
| KR | 101072371 B | 10/2011 |
| WO | WO 2013/055154 | 4/2013 |

* cited by examiner

POLARIZER HAVING PROTECTION FILMS IN TWO SIDES AND OPTICAL DEVICE COMPRISING THE SAME

This application is a National Stage Entry of International Application No. PCT/KR2012/008329, filed Oct. 12, 2012, and claims the benefit of Korean Application Nos. 10-2011-0105505, filed on Oct. 14, 2011, 10-2011-0145111, filed on Dec. 28, 2011, and 10-2012-0113304, filed on Oct. 12, 2012, all of which are hereby incorporated by reference in its entirety for all purposes as if fully set forth herein.

TECHNICAL FIELD

The present invention relates to a double-sided polarizer and an optical device including the same, and more particularly, to a double-sided polarizer having adhesive layers on both sides thereof which are only curable by irradiating light thereon once, to simplify the manufacturing process thereof, and has been developed such that an adhesive layer on a non-irradiated surface has superior adhesive force, and an optical device including the same.

BACKGROUND ART

A polarizer is a film able to convert natural light into polarized light having a specific vibration direction, and is employed in various display devices, such as liquid crystal displays, and organic light emitting devices.

The polarizer includes a polarizing film made of a polyvinyl alcohol (PVA) resin dyed with dichroic dye or iodine, and a protective film stacked on one surface or both surfaces of the polarizing film with an adhesive interposed therebetween. Until recent years, a triacetyl cellulose (TAC) film has been widely used as a protective film. However, the TAC film has a drawback in that it may be deformed in a high temperature and high humidity environment. Therefore, in recent years, protective films made of various materials capable of replacing the TAC film have been developed, and for example, the use of polyethylene terephthalate (PET), a cycloolefin polymer (COP), and an acrylic film, alone or mixtures thereof, has been proposed.

Meanwhile, examples of adhesives that may be used for attaching the polarizing film and the protective film to each other include an acrylic adhesive, a dry laminated adhesive prepared by mixing a urethane resin solution and a polyisocyanate resin solution, a styrene/butadiene/rubber adhesive, an epoxy adhesive, a polyvinyl alcohol adhesive, an urethane adhesive, an adhesive containing a compound having a polyester ionomer type urethane resin and a glycidyl group, a thermosetting adhesive, or the like, while water-based adhesives made of an aqueous solution of polyvinyl alcohol resin may chiefly be used.

However, in the case of the water-based adhesives, when an acrylic film or COP film is used as the protective film instead of the TAC film, the adhesive force of the protective film is weak and thus the protective film has a drawback in that use thereof is limited according to the material of the protective film. Also, in the case of the water-based adhesives, in addition to adhesive failure due to the material, when the protective films applied to both surfaces of a PVA polarizing film are made of different materials, curling of the polarizer may occur in the course of a drying process of the water-based adhesives and a lowering of initial optical properties may be caused. As an alternative to solve these drawbacks, a photo-curable non-water-based adhesive has been proposed.

However, since the photo-curable non-water-based adhesives generally have a high viscosity, a final adhesive layer is so thick that when the polarizer is manufactured by using the photo-curable non-water-based adhesives, failure, such as curling in the TD and MD directions may easily occur.

Also, in the case of a double-sided polarizer with protective films attached to both surfaces of a polarizing film, since the adhesive layers formed on both surfaces of the polarizing film should be cured, respectively, light irradiation should be performed twice, which makes the process complicated. While the adhesive layer may be cured by irradiating light thereonto once, the degrees of curing of the adhesive layers are not equal due to a difference between amounts of light arriving at the light irradiation surface and the light non-irradiation surface, and thus the adhesive force of the light non-irradiation surface is low. Thus, the low adhesive force of the adhesive layer deteriorates the durability of the polarizer to thus lower the optical properties of the polarizer.

DISCLOSURE

Technical Problem

An aspect of the present invention provides a double-sided polarizer having adhesive layers on both sides thereof curable by only irradiating light thereonto once, to simplify the manufacturing process and has been developed such that an adhesive layer on a non-irradiated surface has superior adhesive force, and an optical device including the same.

Technical Solution

According to an aspect of the present invention, there is provided a double-sided polarizer including: a polarizing film; a first adhesive layer formed on one surface of the polarizing film; a second adhesive layer formed on the other surface of the polarizing film; a first transparent film formed on the first adhesive layer; and a second transparent film formed on the second adhesive layer, wherein the first adhesive layer and the second adhesive layer are formed of an active energy line-curable adhesive and the first adhesive layer is 0.1 μm to 3 μm thick.

The second adhesive layer may be preferably 0.1 μm to 10 μm thick. The double-sided polarizer of the present invention may be manufactured by simultaneously curing the first adhesive layer and the second adhesive layer by irradiating an active energy line once, and the irradiating of the active energy line may be preferably performed through an active energy source positioned in the direction of the transparent film formed on the second adhesive layer.

Meanwhile, the first adhesive layer and the second adhesive layer may be preferably formed of a cationic adhesive, which may include: (1) 5 wt % to 90 wt % of an epoxy compound having at least two epoxy groups in a molecule; (2) 5 wt % to 90 wt % of an oxetane compound having at least one oxetanyl group in a molecule; and (3) 0.5 wt % to 20 wt % of a cationic photo-polymerization initiator.

The double-sided polarizer may further include a primer layer at least between the first adhesive layer and the first transparent film or between the second adhesive layer and the second transparent film, and the primer layer may be preferably formed of a primer composition including part to weight to 50 parts by weight of a urethane polymer, 0.1 part by weight to 10 parts by weight of water-dispersed fine particles, and the balance of water.

According to another aspect of the present invention, there is provided an optical device including a double-sided polarizer having the above configuration.

Advantageous Effects

According to the double-sided polarizer of the present invention, since the adhesive layer of an active energy line-non irradiated surface is formed to have a thickness within the range of 0.1 μm to 3 μm, the adhesive layers on both surfaces of the polarizer can be formed at the same time by irradiating an active energy line once, thereby simplifying the manufacturing process.

Also, the double-sided polarizer of the present invention has superior adhesive force between the polarizer and the transparent film, superior durability and water resistance, and superior optical property even in harsh environment.

BEST MODE

Hereinafter, the present invention will be described in more detail.

The present inventors have performed a large amount of research to develop a double-sided polarizer having superior durability, heat resistance, and optical property, and as a result of the research, have developed a double-sided polarizer of the present invention characterized by forming an adhesive layer by using an active energy line-curable adhesive and at the same time forming the adhesive layer to have a thickness within a specific range.

More specifically, the present invention relates to a double-sided polarizer including: a polarizing film; a first adhesive layer formed on one surface of the polarizing film; a second adhesive layer formed on the other surface of the polarizing film; a first transparent film formed on the first adhesive layer; and a second transparent film formed on the second adhesive layer, wherein the first adhesive layer and the second adhesive layer are formed of an active energy line-curable adhesive and the first adhesive layer is 0.1 μm to 3 μm thick.

In the present description, a double-sided polarizer means a polarizer including protective films attached to both surfaces of a polarizing film, and is discriminated from a single-sided polarizer.

In related art double-sided polarizers, a first adhesive layer and a second adhesive layer are generally formed to have the same thickness, for example, a thickness ranging from 5 μm to 10 μm. However, in the case of the related art double-sided polarizers having the foregoing adhesive thickness range, to obtain a sufficient adhesive force, light should be irradiated onto each of the first adhesive layer and the second adhesive layer for curing of the first adhesive layer and the second adhesive layer. This is because one light irradiation allows one adhesive layer facing the light irradiation direction to secure sufficient adhesive force, but the other adhesive layer not facing the light irradiation direction to secure insufficient adhesive force. Thus, the related art doubled-sided polarizers have a drawback in that the manufacturing process is complicated.

However, as a result of the present inventors' studies, it was surprisingly indicated that when an adhesive layer (for the convenience of description, referred to as "first adhesive layer") formed on an opposite side of an active energy line to an irradiation direction is formed to have a thickness ranging from 0.1 μm to 3 μm, only one irradiation secured superior adhesive force in both adhesive layers on both surfaces of a polarizing film. Table 1 below shows measurement results of delamination force according to the thickness of the first adhesive layer formed on an active energy line non-irradiated surface.

TABLE 1

| Thickness of first adhesive layer | Delamination force of first adhesive layer [N] |
|---|---|
| >1 μm | 2.5 |
| 1 μm | 2.5 |
| 3 μm | 2.5 |
| 5 μm | 1.5 |
| 7 μm | 0.5 |
| 10 μm | 0.2 |

As shown in table 1 above, when the thickness of the first adhesive layer exceeds 3 μm, the delamination force of the adhesive force is remarkably lowered. Thus, in the case that the delamination force of the adhesive layer is lowered, the polarizing film and the transparent film may be easily delaminated to thus have a bad influence on the durability and optical properties of the polarizer.

Meanwhile, it was proven that an adhesive layer (for the convenience of description, hereinafter referred to as a "second adhesive layer") formed on a side directly facing the irradiation direction of the active energy line did not show a difference in adhesive force according to the thickness thereof. If the thickness of the second adhesive layer is too thick, curling of a final product, i.e., a polarizer may occur. Thus, it is preferable that the second adhesive layer be formed as thinly as possible. For example, in the present invention, the second adhesive layer may be formed to be 0.1 μm to 10 μm thick, preferably 0.1 μm to 7 μm thick, and more preferably, 0.1 μm to 5 μm thick.

The double-sided polarizer of the present invention configured as above may be manufactured by simultaneously curing the first adhesive layer and the second adhesive layer by irradiating an active energy line once, and the irradiating of the active energy line may be preferably performed through an active energy source positioned in the direction of the transparent film formed on the second adhesive layer. At this time, examples of the active energy source may include ultraviolet light, an electron beam, microwaves, infrared light (IR), X-ray, a gamma-ray, and a particle beam, such as an alpha-particle beam, a proton beam, or a neutron beam, and ultraviolet light or an electron beam may typically be used.

In the present invention, it is preferable that the first adhesive layer and the second adhesive layer are formed of an active energy line-curable adhesive, cured by an active energy line. To form the thickness of the adhesive layer thinly as above, it is preferable that the active energy line-curable adhesive has a viscosity ranging from 15 cP to 50 cP. In consideration of durability, thermal impact, or the like, it is preferable that the active energy line-curable adhesive has a glass transition temperature of not less than 90° C.

More preferably, the first adhesive layer and the second adhesive layer may be formed of a cationic adhesive. Herein, a cationic adhesive means an adhesive of which a main component is a compound cured by a cationic polymerization reaction.

For example, the cationic adhesive include: (1) 5 wt % to 90 wt % of epoxy compound having at least two epoxy groups in a molecule; (2) 5 wt % to 90 wt % of oxetane compound having at least one oxetanyl group in a molecule; and (3) 0.5 wt % to 20 wt % of cationic photo-polymerization initiator.

The kinds of epoxy compound of (1) are not particularly limited if epoxy compounds have at least two epoxy groups in a molecule. For example, epoxy resins well known in the art, such as aromatic epoxy resins, alicyclic epoxy resins, or aliphatic epoxy resins alone or combinations thereof may be used.

The aromatic epoxy means an epoxy including an aromatic group in a molecule, and may include, for example, a bisphenol type epoxy resin, such as a bisphenol A-type epoxy, a bisphenol F-type epoxy, a bisphenol S-type epoxy, or a brominated bisphenol type epoxy; a novolac type epoxy resin, such as a phenol novolac type epoxy resin and a cresol novolac type epoxy resin; a cresol epoxy, resorcinol glycidyl ether, and the like.

The alicyclic epoxy means a compound of which an epoxy group is formed between two neighboring carbon atoms constituting an alicyclic ring, and may include, for example, dicyclopentadien dioxide, limonene dioxide, 4-vinylcyclohexene dioxide, 2,4-epoxycyclohexylmethyl 3,4-epoxycyclohexane carboxylate, diclopentadien dioxide, bis(3,4-epoxycyclohexylmethyl)adipate, and the like.

The alicyclic epoxy may include a polyglycidyl ether of alicyclic polyalcohol, an alkylene oxide-added polyglycidyl ether of alicyclic polyalcohol, and the like.

The alicyclic polyalcohol may include, for example, alicyclic polyalcohols having 2-20 carbon atoms. More specifically, the alicyclic polyalcohol may include aliphatic diols, such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentane diol, 2,4-diethyl-1,5-pentanediol, 1,6-hexanediol, 1,7-heptanediol, 3,5-heptanediol, 1,8-octane diol, 2-methyl-1,8-octanediol, 1,9-nonanediol, 1,10-decanediol; alicyclic diols, such as cyclohexanedimethanol, cyclohexanediol, hydrogenated bisphenol A, hydrogenated bisphenol F; and three or more-valent polyols, such as trimethylolethane, trimethylolpropane, hexitols, pentitols, glycerin, polyglycerin, pentaerythritol, dipentaerythritol, tetramethylol propane.

More specifically, the alkylene oxide may include, for example, ethylene oxide, propylene oxide, butylene oxide, and the like.

Meanwhile, it is more preferable to use a combination of a first epoxy compound including an epoxidized aliphatic ring group, i.e., at least one alicyclic epoxy ring, and a second epoxy compound including one or more glycidyl ether group as the epoxy compound, but the present invention is not limited thereto.

By using the combination of the first epoxy compound and the second epoxy compound, an adhesive for a polarizer with enhanced thermal impact properties may be prepared. At this time, the first epoxy compound and the second epoxy compound may be mixed preferably in a weight ratio of 1:1 to 3:1, more preferably 1:1 to 2:1, most preferably 1:1. When the weight ratio of the first epoxy compound and the second epoxy compound satisfies the above range, the most preferable physical properties may be obtained in regard to glass transition temperature, adhesive force and viscosity. In the present invention, the first epoxy compound and the second epoxy compound may be included by, for example 20-60 parts by weight with respect to 100 parts by weight of the overall adhesive composition.

The first epoxy compound may be at least one selected from the group consisting of, for example, 3,4-epoxycyclohexylmethyl-3,4'-epoxycyclohexanecarboxylate, bis(3,4-epoxycyclohexylmethyl)adipate dicyclopentadiene dioxide, limonene dioxide, and 4-vinylcyclohexene dioxide. The first epoxy compound is used for elevating glass transition temperature (Tg), and providing the adhesive layer with hardness, and may be most preferably 3,4-epoxycyclohexylmethyl-3,4'-epoxycyclohexanecarboxylate.

The second epoxy compound is not particularly limited if it includes one or more glycidyl ether group, and may be one or more selected from the group consisting of, for example, 1,4-cyclohexanedimethanol diglycidyl ether, novolac epoxy, bisphenol A-type epoxy, bisphenol F-type epoxy, brominated bisphenol type epoxy 1,6-hexanediol diglycidyl ether, trimethylolpropane triglycidyl ether, n-butyl glycidyl ether, aliphatic glycidyl ether (C12-C14), 2-ethylhexyl glycidyl ether, phenyl glycidyl ether, o-cresyl diglycidyl ether, and nonyl phenyl glycidyl ether. The second epoxy compound is used for providing the adhesive with softness and enhancing the adhesive force, more preferably includes an aliphatic ring, and most preferably, may be 1,4-cyclohexanedimethanol diglycidyl ether.

Next, the oxetane compound of (2) is not particularly limited if it has at least one oxetanyl group in a molecule, and may be an oxetane compound well known in the art. Examples of the oxetane compound may include 3-ethyl-3-[(3-ethyl-oxetane-3-yl)methoxy methyl]oxetane, 1,4-bis[(3-ethyl oxetane-3-yl)methoxy methyl]benzene, 1,4-bis[(3-ethyl oxetane-3-yl)methoxy]benzene, 1,3-bis[(3-ethyl-oxetane-3-yl)methoxy]benzene, 1,2-bis[(3-ethyl-oxetane-3-yl)methoxy]benzene, 4,4'-bis[(3-ethyl oxetane-3-yl)methoxy]biphenyl, 2,2'-bis[(3-ethyl-oxetane-3-yl)methoxy]biphenyl, 3,3',5,5'-tetramethyl-4,4'-bis[(3-ethyl oxetane-3-yl)methoxy]biphenyl, 2,7-bis[(3-ethyl-oxetane-3-yl)methoxy]naphthalene, bis[4-{(3-ethyl oxetane-3-yl)methoxy}phenyl]methane, bis[2-{(3-ethyl oxetane-3-yl)methoxy}phenyl]methane, 2,2-bis[4-{(3-ethyl-oxetane-3-yl)methoxy}phenyl]propane, etherified modified compound by 3-chloro-methyl-3-ethyl oxetane of novolac-type phenol-formaldehy, 3(4),8(9)-bis[(3-ethyl oxetane-3-yl)methoxy methyl]-tricyclo-[5.2.1.0 2,6]decane, 2,3-bis[(3-ethyl oxetane-3-yl)methoxy methyl]norbornane, 1,1,1-tris[(3-ethyl-oxetane3-1)methoxy methyl]propane, 1-butoxy-2,2-bis[(3-ethyl oxetane-3-yl)methoxy methyl]butane, 1,2-bis[{2-(3-ethyl oxetane-3-yl)methoxy}ethylthio]ethane, bis[{4-(3-ethyl oxetane-3-yl)methylthio}phenyl]sulfide, 1,6-bis[(3-ethyl-oxetane-3-yl)methoxy]-2,2,3,3,4,4,5,5-octa-fluoro-hexane, and the like. Meanwhile, the amount of the oxetane compound is preferably 5 parts by weight to 90 parts by weight, more preferably 10 parts by weight to 90 parts by weight.

Next, the cationic photo-polymerization initiator of (3) is a compound producing a cation species or Louis acid by irradiation of the active energy line, and may include, but is not limited to, for example, onium salts, such as an aromatic diazonium salt, an aromatic iodine aluminum salt, or an aromatic sulfonium salt, iron-arene complexes, and the like. Meanwhile, the amount of the cationic photo-polymerization initiator is 0.5 parts by weight to 20 parts by weight with respect to 100 parts by weight of the overall adhesive composition, preferably 0.5 parts by weight to 15 parts by weight, and more preferably 0.5 parts by weight to 10 parts by weight.

The cationic adhesive composition of the present invention may further include a vinyl compound together with the foregoing components, if necessary. If a vinyl compound is added, low viscosity may be maintained, and a lowering phenomenon in glass transition temperature of the adhesive layer after curing may be decreased.

Examples of the vinyl compound may be hydroxy-C1-6 alkyl vinyl ether and/or vinyl acetate, and the hydroxy-C1-6 alkyl vinyl ether may be at least one selected from the group consisting of hydroxyethyl vinyl ether, hydroxybutyl vinyl ether, 1,4-cyclohexane dimethanol vinylether, 4-(hydroxymethyl)cyclohexyl methyl vinyl ether, ethylene glycol vinyl ether, diethylene glycol monovinylether. The vinyl compound may be contained in a weight ratio of 0.1 parts by weight 10 parts by weight or 0.1 parts by weight to 5 parts by weight with respect to 100 parts by weight of the overall adhesive composition.

The cationic adhesive composition of the present invention may further include a silane coupling agent if necessary together with the foregoing components. The silane coupling agent may lower a surface energy of the adhesive to enhance wettability of the adhesive.

It is more preferable that the silane coupling agent includes cationic polymerization functional groups, such as epoxy groups, vinyl groups, and radical groups. The present inventors have found that the use of the silane coupling agent including the cationic polymerization functional groups may improve the wettability of the adhesive without lowering the glass transition temperature, unlike the case of not using the silane coupling agent. The reason is that the cationic polymerization functional groups of the silane coupling agent react with silane groups of the adhesive composition to form cross-links, thus decreasing the lowering phenomenon in glass transition temperature of the adhesive layer after curing.

The silane coupling agent that is usable in the present invention may be, but limited to, for example, a silane coupling agent expressed by formula 1:

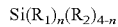  [Formula 1]

where R1 is a cationic polymerization functional group that is bonded to Si atom and includes a cyclic ether group or a vinyloxy group, R2 is hydrogen, a hydroxy group or an alkoxy group bonded to an Si atom, and n is an integer between 1 and 4.

Concrete examples of the silane coupling agent satisfying Formula 1 may include, but are not limited to, 2-(3,4-epoxycyclohexyl)ethyl trimethoxy silane, 3-glycildoxypropyl trimethoxy silane, glycidoxypropyl methyldiethoxy silane, glycidoxypropyl triethoxy silane, vinyltrimethoxy silane or vinylethoxy silane.

Also, the silane coupling agent usable in the present invention may include an oligomer type silane compound including cationic polymerization function groups introduced into a molecule of siloxane oligomer. At this time, the siloxane oligomer may be a low molecular silicon resin of which a molecular-chain end is blocked by an alkoxysilyl group.

At this time, the cationic adhesive composition may be contained in a weight ratio of 0.1 parts by weight 10 parts by weight or 0.1 parts by weight to 5 parts by weight with respect to 100 parts by weight of the overall adhesive composition. The adhesive layer may exhibit a proper surface energy and an adhesivity in the above range.

Meanwhile, the cationic adhesive composition of the present invention may further include a radical polymerization monomer if necessary. Compounds having a radical reactive function group may be used for the radical polymerization monomer without any limitation, and may include, for example, (meth)acrylates having one or more (meth)acryloyl group, (meth)acrylic amides, maleimides, (meth)acrylic acid, maleic acid, itaconic acid, (meth)acryl aldehyde, (meth)acryloyl morpholine, N-vinyl-2-pyrrolidone, triallylisocyanulate, and the like.

Concrete examples of (meth)acrylates having one (meth) acryloyl group in a molecule may include methyl(meth)acrylate, ethyl(meth)acrylate, propyl(meth)acrylate, isopropyl (meth)acrylate, butyl(meth)acrylate, isobutyl(meth)acrylate, 2-ethylhexyl(meta)acrylate, octyl(meth)acrylate, isooctyl (meth)acrylate, lauryl(meth)acrylate, stearyl(meth)acrylate, 2-hydroxyethyl(meth)acrylate, 2-hydroxy-propyl(meth) acrylate, 4-hydroxybutyl(meth)acrylate, cyclohexyl(meth) acrylate, isobornile(meth)acrylate, 1,4-cyclohexane dimethylolmono(meth)acrylate, dicyclopentanyl(meth)acrylate, dicyclopentenyl(meth)acrylate, dicyclopentenyloxyethyl (meth)acrylate, benzyl(meth)acrylate, (meth)acrylate of phenol alkylene oxide adduct, (meth)acrylate of p-kumil phenol alkylene oxide adduct, (meth)acrylate of o-phenyl-phenol alkylene oxide adduct, (meth)acrylate of nonyl phenol alkylene oxide adduct, 2-methoxy-ethyl(meth)acrylate, ethoxy ethoxyethyl(meth)acrylate, (meth)acrylate of 2-ethylhexyl alcohol alkylene oxide adduct, ethylene glycol mono(meth) acrylate, propylene glycol mono(meth)acrylate, pentane diol mono(meth)acrylate, hexanediol mono(meth)acrylate, diethylene glycol mono(meth)acrylate, triethylene glycol mono (meth)acrylate, tetraethylene glycol mono(meth)acrylate, polyethylene glycol mono(meth)acrylate, dipropylene glycol mono(meth)acrylate, tripropylene glycol mono(meth)acrylate, polypropylene glycol mono(meth)acrylate, 2-hydroxy-3-phenoxy-propyl(meth)acrylate, 2-hydroxy-3-butoxy propyl(meth)acrylate, tetrahydrofurfuryl(meth)acrylate, caprolactone degeneration tetrahydrofurfuryl(meth)acrylate, 2-ethyl-2-methyl-1,3-dioxolane-4-yl)methyl(meth)acrylate, (2-isobutyl-2-methyl-1,3-dioxolane-4-yl)methyl(meth)acrylate, (1,4-dioxaspiro[4,5]decane-2-yl)methyl(meth)acrylate, glycidyl(meth)acrylate, 3,4-epoxy cyclohexyl methyl(meth) acrylate, (3-ethyloxetane-3-yl)methyl(meth)acrylate, 2-(meth)acryloyloxymethyl isocyanate, allyl(meth)acrylate, N-(meth)acryloyloxyethyl hexahydrophthalimide, N-(meth) acryloyloxyethyl tetrahydro phthalimide, 2-(meth)acryloyloxyethyl hexahydro phthalic acid, 2-(meth)acryloyloxyethyl oxyethyl succinic acid, co-carboxy polycaprolactone mono (meth)acrylate, 2-(meth)acrylate oxyethyl acid phosphate, and the like.

Also, concrete examples of (meth)acrylic amides may include (meth)acrylamide, N,N-dimethyl(meth)acrylamide, N, N-diethyl(meth)acrylamide, N-methylol(meth)acrylamide, N-(3-N,N-dimethylaminopropyl)(meth)acrylamide, methylenebis(meth)acrylamide, ethylenebis(meth)acrylamide, N,N-diallyl(meth)acrylamide, and the like.

Also, concrete examples of maleimides may include N-methyl maleimide, N-hydroxyethyl maleimide, N-hydroxyethylcitraconimide, urethane acrylate of N-hydroxyethylcitraconimde and isophorone diisocyanate, and the like.

Concrete examples of (meth)acrylates having two (meth) acryloyl groups in a molecule may include 1,3-butanedioldi (meth)acrylate, 1,6-hexanediol di(meth)acrylate, 1,9-nonanedioldi(meth)acrylate, 1,10-decanedioldi(meth) acrylate, 1,3-butyleneglycoldi(meth)acrylate, 2-methacryloyloxyethyl acid phosphate, ethyleneglycoldi (meth)acrylate, diethyleneglycoldi(meth)acrylate, triethyleneglycoldi(meth)acrylate, neopentylglycoldi(meth)acrylate, dipropyleneglycoldi(meth)acrylate, tripropyleneglycoldi(meth)acrylate, tetraethyleneglycoldi (meth)acrylate, cyclohexanedimethanoldi(meth)acrylate, polyethyleneglycoldi(meth)acrylate, polyethyleneglycol (200)di(meth)acrylate, polyethyleneglycol(400)di(meth) acrylate, polyethyleneglycol(600)di(meth)acrylate, glycerin-di(meth)acrylate, 2-hydroxy-3-acryloyloxypropylmethacrylate, dimethyloltricyclodecanedi (meth)acrylate, and the like.

Concrete examples of (meth)acrylates having three (meth) acryloyl groups in a molecule may include trimethylolpropane tri(meth)acrylate, trimethylolpropane tri(meth)acrylate, trimethylolpropane tri(meth)acrylate, ditrimethylolpropane tri(meth)acrylate, trimethylolpropane tri(meth)acrylate, tri(2-hydroxy ethyl)isocyanurate triacrylate, tri(2-hydroxy ethyl)isocyanurate, pentarythritol triacrylate, ethoxylate trimethylolpropane tri(meth)acrylate, proxylatetrimethylolpropane tri(meth)acrylate, and the like.

Concrete examples of (meth)acrylates having four or five (meth)acryloyl groups in a molecule may include pentarythritol tetra(meth)acrylate, di trimethylolpropane tetra(meth)acrylate, dipentarythritol penta(meth)acrylate, epoxylate pentarythrotol tetra(meth)acrylate, pentaacrylate ester, and the like.

Concrete examples of (meth)acrylates having six (meth)acryloyl groups in a molecule may include dipentarythritol hexa(meth)acrylate.

The amount of the radical polymerization monomer is 0 parts by weight to 40 parts by weight with respect to 100 parts by weight of the overall adhesive composition, preferably 5 parts by weight to 30 parts by weight, more preferably 5 parts by weight to 25 parts by weight.

Meanwhile, in case the adhesive composition includes radical polymerization monomers as above, it is preferable to mix a photo-radical polymerization initiator in order to promote the radical polymerization and thus enhance the curing speed. Examples of the photo-radical polymerization initiator may include, but are not limited to, an acetonephenone-based photopolymerization initiator, a benzoin ether-based photopolymerization initiator, a benzo phenone-based photopolymerization initiator, thioxanthone-based photopolymerization initiator, and the like. The amount of the photo-radical polymerization initiator is 0.5 parts by weight to 20 parts by weight with respect to 100 parts by weight of the overall adhesive composition, preferably 0.5 parts by weight to 15 parts by weight, more preferably 0.5 parts by weight to 10 parts by weight.

The cationic adhesive composition may further include a photo enhancer, an antioxidant, oligomer, and an adhesive promoter if necessary, and preferably, may further include urethane acrylate in a weight ratio of more than 0 and not more than 4 parts by weight. In case urethane acrylate is added as above, there is an increase in viscosity, but the viscosity of the adhesive may be lowered by elevating temperature. Meanwhile, in the case that urethane acrylate is added as above, it is possible to provide more proper adhesive force in the use of the adhesive composition for acrylic films.

Since the foregoing adhesive composition of the present invention has a low amount of viscosity ranging from 15 cP to 50 cP, it exhibits superior workability and superior adhesive force in the case of thin adhesive layers.

Also, since the adhesive composition of the present invention has a glass transition temperature of not less than 90° C. after curing, it has superior heat resistance. When heat resistant durability and thermal impact was evaluated at 80° C., it was exhibited that in the case of a polarizer which was manufactured by using the adhesive composition of the present invention, breakage of the polarizing film did not occur.

Also, when the polarizer which was manufactured by using the adhesive composition of the present invention was immersed in water of 60° C. for 24 hours, decoloration of the polarizing film was less than 10 mm in the MD direction, resulting in superior water resistance.

Thus, since the cationic adhesive has superior adhesive force and superior water resistance and heat resistance, it enables the manufacturing of a polarizer having superior characteristics.

Meanwhile, the double-sided polarizer of the present invention may further include a primer layer at least between the first adhesive layer and the first transparent film or between the second adhesive layer and the second transparent film.

The primer layer is to enhance the adhesive force of the transparent films and the adhesive layers, and is preferably formed of a primer composition including a urethane polymer. For example, the primer composition includes a urethane polymer, water-dispersible fine particles, and water, more specifically, 1 part by weight to 50 parts by weight with respect to 100 parts by weight of the primer composition of a urethane polymer, 0.1 parts by weight to 10 parts by weight of water-dispersible fine particles, and the balance of water.

The urethane polymer is obtained by reacting polyol and polyisocyanate. The polyol is not particularly limited if it has two or more hydroxyl groups, and any proper polyol may be employed. For example, the polyol may be polyesterpolyol, polyether polyol, polycarbonatediol, or the like, and polyesterpolyol, polyether polyol, and polycarbonatediol may be used alone or in combinations thereof.

Preferably, the polyol may be at least one selected from the group consisting of ethylene glycol, 1,2-propaneondiol, 1,3-propanediol, 1,3-butanediol, 1,4-butanediol, neolpentylglycol, pentanediol, 1,6-hexanediol, 1,8-octanediol, 1,10-decanediol, 4,4'-dihydroxyphenylpropane, 4,4'-dihydroxymethylmethane, diethyleneglycol, triethyleneglycol, polyethyleneglycol, dipropyleneglycol, polypropyleneglycol, 1,4-cyclohexanedimethanol, 1,4-cyclohexanediol, bisphenol A, bisphenol F, glycerine, 1,1,1-trimethylolpropane, 1,2,5-hexatriol, pentaerythriol, glucose, sucrose, and sorbitol.

Meanwhile, the polyesterpolyol may be representatively obtained by reacting a polybasic acid component and a polyol component. Examples of the polybasic acid component may include aromatic dicarboxylic acids, such as ortho-phthalic acid, isophthalic acid, terephthalic acid, 1,4-naphthalene dicarboxylic acid, 2,5-naphthalene dicarboxylic acid, 2,6-naphthalene dicarboxylic acid, biphenyl dicarboxylic acid, tetrahydrophthalic acid, and the like; aliphatic dicarboxylic acids, such as oxalic acid, succinic acid, malonic acid, glutaric acid, adipic acid, pimelic acid, suberic acid, azelaic acid, sebacic acid, linoleic acid, maleic acid, fumaric acid, mesaconic acid, itaconic acid; and the like; alicyclic dicarboxylic acids, such as hexa-hydro phthalic acid, tetrahydro phthalic acid, 1,3-cyclohexane dicarboxylic acid, 1,4-cyclohexane dicarboxylic acid, and the like; and reactive derivatives, such as acid anhydrides thereof, alkyl ester, acid halide. The above polybasic acid components may be used alone or in combinations thereof. Further, it is more preferable that the polybasic acid component is at least one selected from the group consisting of polytetramethyleneglycol (PTMG), polypropyleneglycol (PPG), and polyethyleneglycol (PEG).

It is preferable that the polycarbonatepolyol is at least one selected from the group consisting of poly(hexamethylene carbonate)glycol and poly(cyclohexanecarbonate)glycol.

The polyether polyol may be obtained by ring-opening polymerization of alkyleneoxide to a polyalcohol. Examples of the polyalcohol may include ethyleneglycol, diethyleneglycol, propyleneglycol, dipropyleneglycol, glycerin, trimethylolpropane, and the like. The foregoing polyalcohols may be used alone or in combinations thereof.

The isocyanate is not limited if it is a compound having two or more NCO groups, and may include, for example, toluene diisocyanate (TDI), 4,4-diphenyl methane diisocyanate (MDI), 1,5-naphthalene diisocyanate (NDI), tolidine diisocyanate (TODI), hexamethylene diisocyanate (HMDI), isophorone diisocyanate (IPDI), p-phenylene diisocyanate, transcyclohexane, 1,4-diisocyanate, and xylene diisocyanate (XDI). These isocyantes may be used alone or in combinations thereof.

A preparation method of the urethane resin may employ any proper method known in the art. Concrete example of the known method may include a one shot method of reacting respective components once, and a multi-stage method reacting respective components in stages. In the case that the urethane resin has a carboxylic group, the urethane resin is preferably prepared by the multi-stage method because the multi-stage method may easily introduce the carboxylic group. Further, while the urethane resin is prepared, any proper urethane reaction catalyst may be used.

In the preparation of the urethane resin, another polyol and/or another chain extender may be added for a reaction in addition to the above components.

Examples of another polyol may include polyols having three or more hydroxyl groups, such as sorbitol, glycerin, trimethylolethane, trimethylolpropane, pentaerythritol, and the like.

Examples of a chain extender may include glycols, such as ethyleneglycol, diethylene glycol, triethylene glycol, 1,3-propanediol, 1,3-butanediol, 1,4-butanediol, neopentyl glycol, pentane diol, 1,6-hexane diol, propylene glycol, and the like; aliphatic diamines, such as ethylene diamine, propylene diamine, hexamethylene diamine, 1,4-butane diamine, aminoethyl alkanolamine, and the like; alicyclic diamines, such as isophorone diamine, 4,4'-dicyclohexylmethane diamine, and the like; and aromatic diamines, such as xylylene diamine, tolylene diamine, and the like.

Further, while the urethane resin is prepared, a neutralizer may be used. The use of the neutralizer may enhance the stability of the urethane resin in water. Examples of the neutralizer may include, for example, N-methylmorpho line, triethylamine, dimethylethanolamine, methyldiethanolamine, triethanolaminealkyne, morpholine, tripropylamine, ethanolamine, triisopropanolamine, and the like. The foregoing neutralizers may be used alone or in combinations thereof.

In preparing the urethane resin, an organic solvent, inactive with respect to the polyisocyanate and miscible with water is used. Examples of the organic solvent may include ester-based solvents, such as ethyl acetate, ethylcellosolve acetate, and the like; ketone-based solvents, such as acetone, methylethylketone, methylisobutylketone, and the like; ether-based solvents, such as dioxane, tetrahydrofuran, and the like. The foregoing organic solvents may be used alone or in combinations thereof.

Meanwhile, it is more preferable that the urethane polymer includes a carboxylic group. The reason the urethane polymer includes a carboxylic group is because water dispersibility is enhanced to thus further enhance the adhesion between the adhesive layer and the transparent film.

The urethane polymer including the carboxylic group may be obtained, for example, by reacting a chain extender with polyol and polyisocyanate. Examples of the chain extender having the carboxylic group may include dihydroxy carboxylic acid, dihydroxy succinate, and the like. Examples of the dihydroxy carboxylic acid may include dialylol alkanic acids including dimethylolalkanic acid, such as dimethylolacetic acid, dimethyolbutanoic acid, dimethylol propionic acid, dimethyolbutyric acid, dimethylol pentanoic acid, or the like. The above-described polybasic acid components may be used alone or in combinations thereof.

Meanwhile, the amount of the urethane polymer is preferably about 1 part by weight to about 50 parts by weight with respect to 100 parts by weight of the primer composition, more preferably about 3 parts by weight to about 20 parts by weight, most preferably 5 parts by weight to 15 parts by weight. If the urethane polymer is contained in a weight ratio less than 1 part by weight, the adhesiveness is lowered, and if the urethane polymer is contained in a weight ratio more than 30 parts by weight, the viscosity is increased, so that a leveling may be not achieved and a dying time may be increased.

The weight average molecular weight of the urethane polymer is preferably 10,000 to 100,000. If the weight average molecular weight is less than 10,000, the adhesive force is lowered, and if the weight average molecular weight exceeds 100,000, it is difficult to prepare a water-dispersible urethane.

The water-dispersible fine particles that are usable in the present invention may be any proper fine particles, preferably water-dispersible fine particles. Specifically, both inorganic fine particles and organic fine particles may be used. Examples of the inorganic fine particles may include inorganic oxide particles, such as silica, titania, alumina, zirconia, antimony oxides, and the like. Examples of the organic fine particles may include silicon resins, fluorine resins, (meth) acrylic resins, cross-linked polyvinyl alcohols, melamine resins, and the like.

Among the water-dispersible fine particles, silica is preferably used. The reason silica is used is because silica is superior in blocking inhibition and transparency not to generate hazing, and is free of colorization to have a low amount of influence on the optical properties of the polarizer. Also, since silica is good in terms of dispersibility and dispersion stability with respect to primer compositions, the workability for forming the primer layer is more superior than other materials.

The average diameter (average primary particle diameter) of the water-dispersible fine particles is preferably 10 nm to 200 nm, more preferably 20 nm to 70 nm. When the average diameter of the water-dispersible fine particles is less than 10 nm, surface energy is increased, so that agglomeration and precipitation of silica in a primer solution occurs to thereby cause a problem in stability of the solution. When the average diameter is more than 200 nm, silica particles are not uniformly dispersed in the solution and are agglomerated, so that the size of silica is increased to be larger than the wavelength band (400-800 nm) of visible light, and thus silica scatters light of not less than 400 nm to increase hazing. By using the fine particles having the foregoing diameter range, irregularities may be properly formed at the surface of the primer layer to effectively reduce frictional force in a contact surface between an acrylic-based film and the primer layer and/or between the primer layers. As a result, blocking inhibition may be further enhanced.

It is preferable that the amount of the water-dispersible fine particles is 0.1 parts by weight to 10 parts by weight with respect to 100 parts by weight of the primer composition. If the amount of the water-dispersible is less than 0.1 parts by weight, slippage between films on winding does not occur, so that film tearing may occur. If the amount of the water-dispersibility exceeds 10 parts by weight, hazing may occur.

Since the primer composition of the present invention is aqueous, the fine particles are preferably mixed in an aqueous disperson form. Specifically, in case silica is employed as fine particles, silica is preferably mixed in a colloidal silica form. As the colloidal silica, products commercially available in the art may be used, and for example, Snowtex series from Nissan chemical, AEROSIL series from Air product, Epostar series from Nippon catalyst, and Soliostar RA series, LSH series from Ranco, and the like may be used.

Meanwhile, the primer composition may further include a cross-linking agent if necessary. Methylol compounds, such as oxazolin, boric acid, trimethylolmelamine, and the like, carbodiimide, isocyanate, azyridine compounds, and the like may be used as the cross-linking agent.

The cross-linking agent is preferably contained in an amount of 0.1 parts by weight to 30 parts by weight with respect to 100 parts by weight of the primer composition. In case a primer containing the cross-linking agent is used, since the primer layer prevents water from penetrating, the primer composition exhibits superior optical properties, such as water resistance and moisture and heat resistance.

Also, the primer composition may further include a silane coupling agent, a fluorine surfactant, a silane surfactant, and a surfactant containing an alkyl group as other additives if necessary.

The primer layer formed of the above primer composition is preferably about 100 nm to about 1 μm thick. If the primer layer is not more than 100 nm, the adhesive force is decreased, and if the primer layer is not less than 1 μm, the primer layer coated is not completely dried and thus blocking between films may occur, resulting in a tearing of the films.

Also, it is preferable that a water contact angle of a surface of the primer layer is 40 degrees to 100 degrees, more preferably 50 degrees to 90 degrees, most preferably 60 degrees to 80 degrees. If the water contact angle is less than 40 degrees, the hydrophilicity of the primer layer is increased and the primer layer reacts with iodine in the polarizing film to inhibit an arrangement of iodine, thus scattering a single body color and deteriorating the degree of polarization. If the water contact angle exceeds 100 degrees, the hydrophobicity of the primer layer is increased and thus adhesion between the primer layer and the polarizing film becomes difficult.

Next, the first transparent film and the second transparent film are polarizing film protecting films or compensation films for compensating for light characteristics of the polarizing film, and may include polymer films known to the art. The first transparent film and the second transparent film may be formed of the same material or different materials.

More specifically, the transparent film may be at least one selected, but is not limited thereto, from the group consisting of, for example, an acrylic film, a PEF film, an acrylic-based primer-treated PET film, a polynorbornene (PNB) film, a COP film, a polycarbonate film and TAC films including NRT (Fuji film), N TAC (Konica), V TAC (Fuji film), UZ TAC (Fuji film), and the like. Among the foregoing films, the acrylic film is particularly preferable.

In the present invention, the acrylic film used as the transparent film may contain a (meth)acrylate resin. The film containing the (meth)acrylate resin may be obtained, for example, by extruding a forming material containing the (meth)acrylate resin as a main component.

The acrylic film may be a film including a copolymer having an alkyl(meth)acrylate unit and a styrene unit, and an aromatic resin having a carbonate group at a main chain thereof, or a film including an alkyl(meth)acrylate unit, a styrene unit, 3 to 6-membered heterocyclic unit substituted with at least one carbonyl group, and a vinyl cyanide unit.

The acrylic film may be a film including a (meth)acrylate resin having a aromatic ring. An example of the (meth)acrylate resin having the aromatic ring is a resin composition described in Korean Patent Laid Open Publication No. 10-2009-0115040 and including (a) a (meth)acrylate unit including one or more (meth)acrylate derivative; (b) an aromatic unit having a chain with a hydroxy group-contained part, and an aromatic part; and (c) a styrene unit including one or more styrene derivative. Units (a) to (c) may be contained in a resin composition in a copolymer form, or at least two of units (a) to (c) may be contained in a resin composition in a copolymer form.

The acrylic film may be a film including an acrylic resin having a lactone ring structure. Concrete examples of the (meth)acrylate resin having the lactone ring structure are described in Japanese Patent Application Laid Open Publication No. 2000-230016, Japanese Patent Application Laid Open Publication No. 2001-151814, Japanese Patent Application Laid Open Publication No. 2002-120326, etc.

A method of preparing the acrylic film is not particularly limited. For example, the acrylic film may be prepared by sufficiently mixing a (meth)acrylate resin, a polymer, and additives by any proper mixing method to form a thermoplastic resin composition, and then forming a film from the thermoplastic resin composition, or by preparing a (meth)acrylate resin, a polymer, and additives in respective separate solutions, mixing the solutions to form a uniform mixing solution, and then forming a film from the mixing solution.

The thermoplastic resin composition is prepared, for example, by preblending the film raw materials by using any proper mixer, such as an omni mixer to obtain a mixture and then extruding and mulling the obtained mixture. In this case, the mixer used in the extruding and mulling is not particularly limited, and any proper mixer, such as a single-screw extruder, a double-screw extruder, a dispersion kneader, or the like may be used.

The method of forming a film may include any proper forming methods, such as, a solution casting method (solution emulsifying method), a melt extrusion method, a calendar method, a compressive molding method. Among the foregoing film forming methods, the solution casting method (solution emulsifying method) and the melt extrusion method are preferable.

Examples of a solvent used in the solution casting method (solution emulsifying method) may include: aromatic hydrocarbons such as benzene, toluene, xylene, and the like; aliphatic hydrocarbons such as cyclohexane, decalin, and the like; esters such as ethyl acetate, butyl acetate; ketones such as acetone, methyl ethyl ketone, methyl isobutyl ketone, and the like; alcohols such as methanol, ethanol, isopropanol, butanol, isobutanol, methyl cellosolve, ethyl cellosolve, butyl cellosolve, and the like; ethers such as tetrahydrofuran, dioxane, and the like; halogenated hydrocarbons such as dichloromethane, chloroform, carbon tetrachloride, and the like; dimethylformamide; dimethyl sulfoxide, and the like. These solvents may be used or in combinations thereof.

Examples of an apparatus for performing the solution casting method (solution emulsifying method) may include a drum type casting machine, a band type casting machine, a spin coater, and the like. Examples of the melt extrusion method may include a T-die method, an inflation method, and the like. The forming temperature is preferably 150-350° C., and more preferably 200-300° C.

In case the film is formed by using the T-die method, a T-die is installed at a front edge of a single-screw extruder or double-screw extruder published, and the extruded film is wound to obtain a roll-shaped film. At this time, by properly adjusting the temperature of the winding roll to apply an elongation in an extruding direction, the film may be uniaxially elongated. By elongating the film in a direction perpendicular to the extrusion direction, a simultaneous biaxial elongation or a sequential biaxial elongation may be performed.

The acrylic film may be any of a non-elongated film or an elongated film. In the case of the elongated film, the elongated film may be a uniaxial elongation film or a biaxial elongation film, and in the case of the biaxial elongation film, the biaxial elongation film may be any of a simultaneous biaxial elongation film or a sequential biaxial elongation film. The biaxial elongation enhances the mechanical strength of the film to thus enhance the film performance. In case the acrylic film mixed with another thermoplastic resin is elongated, the acrylic film may suppress an increase in phase difference and maintain the optical isotropy.

The elongation temperature is preferably in a range near the glass transition temperature of the thermoplastic resin composition that is a film raw material, for example, (glass transition temperature −30° C.) to (glass transition temperature +100° C.), more preferably, (glass transition temperature −20° C.) to (glass transition temperature +80° C.). If the elongation temperature is less than (glass transition temperature −30° C.), a sufficient extension magnification may not be obtained. On the contrary, if the elongation temperature exceeds (glass transition temperature +100° C.), the flow of the resin composition may occur to hinder a stable elongation.

The elongation magnification defined by an area ratio is 1.1 to 25 times, more preferably 1.3 to 10 times. If the elongation magnification is less than 1.1 times, an enhancement in toughness following the elongation may not be obtained. If the elongation magnification exceeds 25 times, an effect according to an increase in elongation magnification may be insufficient.

The elongation speed in one direction is preferably 10-20,000%/min, more preferably 100-10,000%/min. If the elongation speed is less than 10%/min, an extended period of time may be required to obtain a sufficient elongation magnification to elevate the preparation costs. If the elongation speed exceeds 20,000%/min, a tearing of the elongated film may occur.

The acrylic film may be thermally annealed after elongation, so as to stabilize the optical isotropy or mechanical characteristics thereof. The annealing condition is not particularly limited, and any proper condition known in the art may be employed.

Meanwhile, a surface treatment for enhancement of the adhesive force may be performed with respect to the transparent films if necessary. For example, at least one surface treatment selected from the group consisting of an alkali treatment, a corona treatment, and a plasma treatment.

The foregoing polarizer according to the present invention may be prepared, for example, by coating a primer composition on one surface of a transparent film to form a primer layer, coating an adhesive composition on one surface of the primer layer or a polarizing film to form an adhesive layer, attaching the polarizing film and the transparent film, and curing the adhesive composition through a light irradiation.

The polarizer according to the present invention may be usefully applied to optical devices, such as liquid crystal displays, etc. For example, the optical device of the present invention may be a liquid crystal panel or a liquid crystal display including such a liquid crystal panel and polarizers disposed on both surfaces of the liquid crystal panel. At this time, one of the polarizers may be a polarizer according to the present invention. At this time, the type of the liquid crystal panel included in the liquid crystal display is not particularly limited. For example, published panels, for example, passive matrix panels, such as a twisted nematic (TN) type, a super twisted nematic (STN) type, a ferroelectric (F) type, or a polymer dispersed (PD) type; active matrix panels such as a two terminal type, or a three terminal type; an in plane switching (IPS) panel; and a vertical alignment (VA) panel may be all applied regardless of the type. Also, types of other elements constituting the liquid crystal display, for example, upper and lower substrates (i.e., color filter substrate and array substrate) are not particularly limited, and elements published in the art may be employed without any limitation.

MODE FOR INVENTION

Hereinafter, the present invention will be described in more detail with examples thereof. However, following examples are merely provided for illustration, and the scope of the present invention is not limited to the following examples.

Preparation Example 1

Preparation of Transparent Film

A resin composition, in which poly(N-cyclohexylmaleimide-co-methylmethacrylate) resin, styrene-maleic anhydride copolymer resin and phenoxy resin were uniformly mixed in a weight ratio of 100:2.5:5, was supplied to a 24φ-extruder that was substituted with nitrogen from a raw material hopper to the extruder, and melted at 250° C. to obtain raw material pellets.

As the phenoxy based resin, PKFE (Mw=60,000, Mn=16,000, $T_g$=98° C.) manufactured by InChemRez® Co., Ltd., was used; as the styrene-maleic anhydride copolymer resin, Dylaeck 332 containing 85 wt % of styrene and 15 wt % of maleic anhydride was used; and the poly(N-cyclohexylmaleimide-co-methylmethacrylate) resin in which the content of N-cyclohexylmaleimide measured by NMR analysis is 6.5 wt % was used.

The obtained raw material pellets were dried under a vacuum, melted at 260° C. by using the extruder and passed through a coat hanger typed T-die, and then passed through the chrome coated casting roll and the drying roll to thereby prepare a film having a thickness of 150 μm. This film was elongated by a ratio of 170% using a difference in speed between rolls in an MD direction at 125° C. by using a pilot elongating apparatus.

(1) Preparation of Acrylic Film A

An acrylic film prepared through the process above was subjected to corona treatment, and one side of the acrylic film was then coated, by using a #7 bar, with a primer composition, in which 10 parts by weight of carbodiimide-based crosslinking agent (carbodinite SV-02 manufactured by Nisshinbo Chemical) was added to a primer composition having 10 wt % of a solid component which was prepared by diluting CK-PUD-F (Chokwang urethane dispersion) with pure water. Thereafter, the primer composition was elongated at 130° C. in a TD direction by 190% using a tenter to obtain an acrylic film A having a primer layer thickness of 400 nm.

(2) Preparation of Acrylic Film B

The acrylic film prepared according to (1) of Preparation Example 1 was subjected to a corona treatment, and one side of the acrylic film was then coated, by using a #7 bar, with a primer composition, in which 20 parts by weight of oxazoline cross-linking agent (WS700 manufactured by Nippon Shokubai Co., Ltd.) was added to a primer composition having 10 wt % of a solid component which was prepared by diluting CK-PUD-F (Chokwang urethane dispersion) with pure water. Thereafter, the primer composition was elongated at 130° C. in a TD direction by 190% using a tenter to obtain an acrylic film B having a primer layer thickness of 400 nm.

Preparation Example 2

Preparation of Adhesive Composition (1) Adhesive Composition A 5 parts by weight of CPI 100P (Sanapro) as a cationic initiator was added to 100 parts by weight of a resin composition which was obtained by adding 25 wt % of 3,4-epoxycyclohexylmethyl-3,4'-epoxycyclohexanecarboxylate (Celloxide 2021P of Dicel Chemical Industries, Ltd), 25 wt % of 1,4-cyclohexane dimethanol diglycidylether, 35 wt % of 3-ethyl-3-[(3-ethyloxetane-3-yl)methoxymethyl]oxetane (Aron Oxcetane DOX 221, Toagosei Co., Ltd.), and 15 wt % of 3-ethyl-3-hydroxymethyl oxetane (Aron Oxcetane OXA, Toagosei Co., Ltd.), thus preparing an adhesive composition A for a polarizer.

(2) Adhesive Composition B 5 parts by weight of CPI 100P (Sanapro) as a cationic initiator and 5 parts by weight of vinyl triethoxysilane were added to 100 parts by weight of a resin composition which was obtained by adding 25 wt % of 3,4-epoxycyclohexylmethyl-3,4'-epoxycyclohexanecarboxylate (Celloxide 2021P of Dicel Chemical Industries, Ltd), 25 wt % of 1,4-cyclohexane dimethanol diglycidylether, and 50 wt % of 3-ethyl-3-[(3-ethyloxetane-3-yl)methoxymethyl]oxetane (Aron Oxcetane DOX 221, Toagosei Co., Ltd.), thus preparing an adhesive composition B for a polarizer.

(3) Adhesive Composition C 5 parts by weight of CPI 100P (Sanapro) as a cationic initiator and 5 parts by weight of vinyl acetate were added to 100 parts by weight of a resin composition which was obtained by adding 25 wt % of 3,4-epoxycyclohexylmethyl-3,4'-epoxycyclohexanecarboxylate (Celloxide 2021P of Dicel Chemical Industries, Ltd), 25 wt % of 1,4-cyclohexane dimethanol diglycidylether, and 50 wt % of 3-ethyl-3-[(3-ethyloxetane-3-yl)methoxymethyl]oxetane (Aron Oxcetane DOX 221, Toagosei Co., Ltd.), thus preparing an adhesive composition C for a polarizer.

Example 1

By using a micro gravure coater, primer layers of 2 sheets of the acrylic film A prepared by Preparation Example 1 were coated with adhesive composition A such that a final thickness of the adhesive layer was 1 µm. Thereafter, the two sheets of the acrylic film (A) coated with the adhesive composition was laminated on both sides of a PVA device, and ultraviolet (UV) light of 500 mJ/cm$^2$ was irradiated in a one-side direction of the PVA device using a UV irradiation apparatus (for example, metal halide lamp) to obtain a polarizer.

Example 2

A polarizer was prepared in the same manner as Example 1 except that adhesive composition B was used.

Example 3

A polarizer was prepared in the same manner as Example 1 except that adhesive composition C was used.

Example 4

A polarizer was prepared in the same manner as Example 1 except that the adhesive composition was coated to have a thickness of 3 µm.

Example 5

A polarizer was prepared in the same manner as Example 2 except that the adhesive composition was coated to have a thickness of 3 µm.

Example 6

A polarizer was prepared in the same manner as Example 3 except that the adhesive composition was coated to have a thickness of 3 µm.

Example 7

The primer layers of the acrylic film A prepared by Preparation Example 1 was coated with adhesive composition A using a micro gravure coater such that a final thickness of the adhesive layer was 1 µm (hereinafter, referred to as 'acrylic film A-1'). Also, the primer layers of the acrylic film A prepared by Preparation Example 1 was coated with adhesive composition A using a micro gravure coater such that a final thickness of the adhesive layer was 3 µm (hereinafter, referred to as 'acrylic film A-2'). Thereafter, the acrylic film A-1 and the acrylic film A-2 were laminated on both sides of a PVA device, and UV light of 500 mJ/cm$^2$ was irradiated onto a side on which the acrylic film A-2 was laminated using a UV irradiation apparatus (for example, metal halide lamp) to obtain a polarizer.

Example 8

The primer layers of the acrylic film A prepared by Preparation Example 1 was coated with adhesive composition A using a micro gravure coater such that a final thickness of the adhesive layer was 3 µm (hereinafter, referred to as 'acrylic film A-3'). Also, the primer layers of acrylic film A prepared by Preparation Example 1 were coated with adhesive composition A using a micro gravure coater such that a final thickness of the adhesive layer was 10 µm (hereinafter, referred to as 'acrylic film A-4'). Thereafter, acrylic film A-3 and the acrylic film A-4 were laminated on both sides of a PVA device, and UV light of 500 mJ/cm$^2$ was irradiated onto a side on which the acrylic film A-4 was laminated using a UV irradiation apparatus (for example, metal halide lamp) to obtain a polarizer.

Example 9

The primer layers of the acrylic film B prepared by Preparation Example 1 was coated with adhesive composition A using a micro gravure coater such that a final thickness of the adhesive layer was 1 µm (hereinafter, referred to as 'acrylic film B-1'). Also, the primer layers of the acrylic film B prepared by Preparation Example 1 were coated with adhesive composition A using a micro gravure coater such that a final thickness of the adhesive layer was 3 µm (hereinafter, referred to as 'acrylic film B-2'). Thereafter, the acrylic film B-1 and the acrylic film B-2 were laminated on both sides of a PVA device, and UV light of 500 mJ/cm$^2$ was irradiated onto a side on which the acrylic film B-2 was laminated using a UV irradiation apparatus (for example, metal halide lamp) to obtain a polarizer.

Comparative Example 1

A polarizer was prepared in the same manner as Example 1 except that the adhesive composition was coated to a thickness of 5 µm.

Comparative Example 2

A polarizer was prepared in the same manner as Example 2 except that the adhesive composition was coated to a thickness of 5 μm.

Comparative Example 3

A polarizer was prepared in the same manner as Example 3 except that the adhesive composition was coated to a thickness of 5 μm.

Experimental Example 1

Evaluation of Delamination Force of Polarizer

Measurement for delamination force of a first adhesive layer was performed on the polarizers prepared by Examples 1 to 9 and Comparative Examples 1 to 3. The delamination force was obtained by measuring a delamination force when the acrylic film on a side where UV light was not irradiated was delaminated from the PVA device by using a polarizer having a width of 20 mm and a length of 100 mm. The results are shown in Table 1 below. The case where the delamination force exceeds 2 N/cm was represented as OK, and otherwise as NG.

Experimental Example 2

Evaluation of Water Resistance

The polarizers prepared by Examples 1 to 9 and Comparative Examples 1 to 3 were laminated on a glass substrate, and then immersed in a constant temperature bath of 60° C. Water resistance was determined by observing whether an end of the polarizer after the elapse of 8 hours was decolored or not. The case where in which was no change was represented as OK, and otherwise as NG.

Experimental Example 3

Evaluation of Thermal Impact Property

The polarizers prepared by Examples 1 to 9 and Comparative Examples 1 to 3 were laminated on a glass substrate, and then left for 30 minutes at −40° C. Thereafter, the polarizers are left for 30 minutes at 80° C. again and this was repeated 100 times. Afterwards, whether the external appearance of the polarizer was deformed was estimated with the naked eye. The case where the external appearance of the polarizer was not deformed was represented as OK, and otherwise as NG. The results are shown in Table 2 below.

TABLE 2

| Item | Primer — Surface irradiated with UV | Primer — Surface not irradiated with UV | Adhesive | Thickness of first adhesive layer [μm] | Thickness of second adhesive layer [μm] | Delamination force of first adhesive layer | Water resistance | Thermal impact |
|---|---|---|---|---|---|---|---|---|
| Example 1 | 10 parts by weight of CkPUD F + SV-02 | 10 parts by weight of CkPUD F + SV-02 | A | 1 | 1 | OK | OK | OK |
| Example 2 | 10 parts by weight of CkPUD F + SV-02 | 10 parts by weight of CkPUD F + SV-02 | B | 1 | 1 | OK | OK | OK |
| Example 3 | 10 parts by weight of CkPUD F + SV-02 | 10 parts by weight of CkPUD F + SV-02 | C | 1 | 1 | OK | OK | OK |
| Example 4 | 10 parts by weight of CkPUD F + SV-02 | 10 parts by weight of CkPUD F + SV-02 | A | 3 | 3 | OK | OK | OK |
| Example 5 | 10 parts by weight of CkPUD F + SV-02 | 10 parts by weight of CkPUD F + SV-02 | B | 3 | 3 | OK | OK | OK |
| Example 6 | 10 parts by weight of CkPUD F + SV-02 | 10 parts by weight of CkPUD F + SV-02 | C | 3 | 3 | OK | OK | OK |
| Example 7 | 10 parts by weight of CkPUD F + SV-02 | 10 parts by weight of CkPUD F + SV-02 | A | 1 | 3 | OK | OK | OK |
| Example 8 | 10 parts by weight of CkPUD F + SV-02 | 10 parts by weight of CkPUD F + SV-02 | A | 3 | 10 | OK | OK | OK |
| Example 9 | 20 parts by weight of CkPUD F + WS700 | 20 parts by weight of CkPUD F + WS700 | A | 1 | 3 | OK | OK | OK |
| Comparative Example 1 | 10 parts by weight of CkPUD F + SV-02 | 10 parts by weight of PUD F + SV-02 | A | 5 | 5 | NG | OK | OK |
| Comparative Example 2 | 10 parts by weight of CkPUD F + SV-02 | 10 parts by weight of PUD F + SV-02 | B | 5 | 5 | NG | OK | OK |
| Comparative Example 3 | 10 parts by weight of CkPUD F + SV-02 | 10 parts by weight of PUD F + SV-02 | C | 5 | 5 | NG | OK | OK |

The invention claimed is:

1. A double-sided polarizer comprising: a polarizing film; a first adhesive layer formed on one surface of the polarizing film; a second adhesive layer formed on the other surface of the polarizing film; a first transparent film formed on the first adhesive layer; and a second transparent film formed on the second adhesive layer,
   wherein the first adhesive layer and the second adhesive layer are formed of an active energy line-curable adhesive, and the first adhesive layer is 0.1 μm to 3 μm thick,
   wherein the first adhesive layer and the second adhesive layer are formed of a cationic adhesive, and the cationic adhesive includes: (1) 5 wt % to 90 wt % of an epoxy compound which is a combination of a first epoxy compound including one or more epoxidized aliphatic ring group and a second epoxy compound including one or more glycidyl ether group; (2) 5 wt % to 90 wt % of an oxetane compound having at least one oxetanyl group in a molecule; and (3) 0.5 wt % to 20 wt % of a cationic photo-polymerization initiator,
   wherein the first epoxy compound and the second epoxy compound have a weight ratio of 1:1 to 3:1, and
   wherein a weight of the first epoxy compound is more than or equal to a weight of the second epoxy compound.

2. The double-sided polarizer of claim 1, wherein the second adhesive layer is 0.1 μm to 10 μm thick.

3. The double-sided polarizer of claim 1, wherein the irradiating of the active energy line is performed through an active energy source positioned in the direction of the transparent film formed on the second adhesive layer.

4. The double-sided polarizer of claim 1, wherein the cationic adhesive further comprises one or more selected from the group consisting of a silane coupling agent, a vinyl compound, and a radical polymerization monomer.

5. The double-sided polarizer of claim 1, further comprising a primer layer at least between the first adhesive layer and the first transparent film or between the second adhesive layer and the second transparent film.

6. The double-sided polarizer of claim 5, wherein the primer layer is formed of a primer composition including 1 part to weight to 50 parts by weight of a urethane polymer, 0.1 part by weight to 10 parts by weight of a water-dispersed fine particles, and the balance of water.

7. The double-sided polarizer of claim 6, wherein the primer composition further comprises a cross-linking agent.

8. The double-sided polarizer of claim 5, wherein the primer layer is 100 nm to 1 μm thick.

9. The double-sided polarizer of claim 1, wherein at least one of the first transparent film and the second transparent film is an acrylic film.

10. An optical device comprising a double-sided polarizer of claim 1.

* * * * *